United States Patent
Yu

(10) Patent No.: US 8,820,352 B2
(45) Date of Patent: Sep. 2, 2014

(54) MULTI-FUNCTIONAL CONCEALED SHOWER VALVE

(75) Inventor: Guang Yu, Hangzhou (CN)

(73) Assignee: Yatin Bath Corporation, Hangzhou, Zhejiang Province (CN)

( * ) Notice: Subject to any disclaimer, the term of this patent is extended or adjusted under 35 U.S.C. 154(b) by 407 days.

(21) Appl. No.: 13/176,824

(22) Filed: Jul. 6, 2011

(65) Prior Publication Data
US 2012/0012210 A1    Jan. 19, 2012

(30) Foreign Application Priority Data
Jul. 14, 2010   (CN) ...................... 2010 2 0257127 U

(51) Int. Cl.
| F16K 11/10 | (2006.01) |
| F16L 5/00 | (2006.01) |
| E03B 1/04 | (2006.01) |
| E03C 1/04 | (2006.01) |
| F16K 27/12 | (2006.01) |
| F16K 11/00 | (2006.01) |

(52) U.S. Cl.
CPC ................. F16K 19/00 (2013.01); F16K 27/12 (2013.01)
USPC ............. 137/597; 137/360; 137/614.2; 4/676

(58) Field of Classification Search
CPC ............. F16K 19/006; F16L 5/00; E03B 1/04
USPC ......... 137/356, 357, 359, 360, 597, 605, 606, 137/607, 614.2; 4/675, 676, 677, 678
See application file for complete search history.

(56) References Cited

U.S. PATENT DOCUMENTS

| 4,095,610 | A | * | 6/1978 | Priesmeyer | 137/100 |
| 4,243,063 | A | * | 1/1981 | Parkison | 137/100 |
| 5,884,652 | A | * | 3/1999 | Yeh et al. | 137/98 |
| 6,050,285 | A | * | 4/2000 | Goncze et al. | 137/98 |
| 6,279,604 | B1 | * | 8/2001 | Korb et al. | 137/359 |
| 6,321,777 | B1 | * | 11/2001 | Wu | 137/315.12 |
| 6,422,520 | B1 | * | 7/2002 | Hand | 248/65 |
| 6,601,604 | B1 | * | 8/2003 | Cooper | 137/269 |
| 6,718,569 | B2 | * | 4/2004 | Burger et al. | 4/695 |
| 6,761,184 | B1 | * | 7/2004 | Jordan | 137/238 |
| 7,458,389 | B2 | * | 12/2008 | Doverspike | 137/360 |
| 2008/0252073 | A1 | * | 10/2008 | Frey | 285/330 |

FOREIGN PATENT DOCUMENTS

CN    201232801 Y    5/2009

* cited by examiner

*Primary Examiner* — Craig Schneider
*Assistant Examiner* — Jonathan Waddy
(74) *Attorney, Agent, or Firm* — Jacobson Holman PLLC; Jiwen Chen

(57) ABSTRACT

A pressure-adjustable concealed shower valve includes a shell, containing an embedded body with water channels. A cover board that communicates with the water channels is arranged on the body. The body is provided with channels for hot water and cold water. The hot water channel and cold water channel are provided with a partition wall with a hole. The partition wall separates water inlets and outlets of the hot water channel and cold water channel. A buffer unit that can be opened and closed is arranged on the partition wall. The buffer unit contains a fixed adjustment screw and the corresponding booster spring and the central rod. The end of the central rod matches with the hole on the partition wall and can form an open or close structure. The partition wall and the buffer unit are arranged away from the straight line in which the water channel is located.

9 Claims, 3 Drawing Sheets

MULTI-FUNCTIONAL CONCEALED SHOWER VALVE

The present application claims the priority benefit of China Patent Application No. 201020257127.9, filed Jul. 14, 2010, issued on Jan. 19, 2011 as Chinese Utility Model Patent No. ZL201020257127.9, the content of which is incorporated herein by reference.

FIELD OF THE INVENTION

The present invention relates to a shower valve, especially a pressure-adjustable concealed shower valve.

BACKGROUND OF THE INVENTION

Presently, shower valves or taps used in bathroom have cold water and hot water separated. The flow of the cold water and the hot water is controlled by valve openness. The wider the valve is opened, the bigger the water flow is. The narrower the valve is opened, the smaller the flow is. Pressure will be generated when water flows out, exerting an impact on each valve. These valves are rigid and have no buffering function. When the valve is opened, the surge of water flow will impact the valve, thus shortening the service life of the valve. Since there is no buffer unit, when cold/hot water is adjusted, some water will flow back. For example, hot water may flow back to join the hot water behind, and may flow back to the location of the cold water pipe, causing partial pollution. Without a buffer unit, water at a high temperature sprays out from the tap at a high speed, which is unpredictable and can easily cause burns to a user. So it is dangerous in operation.

China Intellectual Property Office published Patent No. CN201232801Y on May 6, 2009, which is related to an embedded unit of tap body including an embedded box and a lower body. The lower body is fixed in the embedded box. Two or more water pipelines are arranged. One end of the pipeline penetrates through the lateral wall of the embedded box. The other end forms a through hole on an upper surface of the lower body. However, this device is not provided with a buffer unit, so the high-pressure hot water will directly eject from the tap, which is unpredictable. Besides, the scope of water flow dispersion becomes narrower and narrower after the pressure has dropped, so a user needs to adjust the valve to control the scope of water flow dispersion. The rigid structure also causes backflow of the water.

SUMMARY OF THE INVENTION

The present invention solves the defect of the prior technology wherein the shower valve is rigid and the water pipeline is not provided with a buffer unit. The prior technology easily causes imbalance of water pressure, and may cause instant pressure surge that impacts the valve and reduces the service life. The present invention provides a simple-structured multi-functional concealed shower valve that is provided with a buffer unit in the water pipeline to adjust and balance the water pressure, prevent instant pressure surge and thus extend the service life of the valve.

The present invention also solves the problem in prior technology where the shower valve is rigid and without buffer device which may cause backflow of water when closing the water channel and cause pollution to the water that follows. The present invention provides a multi-functional concealed shower valve which is provided with a buffer unit in the water channel to avoid instant shutoff and water backflow.

The present invention adopts the following technical solution. The present invention provides a multi-functional concealed shower valve, including a shell. The shell is provided with an embedded body with water channels. A cover board that communicates with the water channels is arranged on the surface of the embedded body. The embedded body is further provided with channels for hot water and cold water respectively. The hot water channel and the cold water channel are provided with a partition wall with a hole. The partition wall separates the water inlets and outlets of the hot water channel and the cold water channel. A buffer unit that can be opened and closed is arranged on the partition wall. The buffer unit contains a fixed adjustment screw and the corresponding booster spring and the central rod. The end of the central rod matches with the hole on the partition wall and can form an open or close structure. The partition wall separates the cold water channel and the hot water channel. A buffer unit is arranged on the partition wall, so that the water in the cold water channel and the hot water channel cannot flow directly from the inlet to the outlet, thus reducing water flow pressure and relieving surge of valve. The buffer unit can balance the pressure of the hot water channel and the cold water channel. When the pressure is different, the buffer unit can adjust water pressure, especially the instant pressure, automatically, when the water is opened, thus extending the service life of the valve, especially the concealed valve. After the service life of the valve is extended, it is not necessary to change the valve frequently, which makes the operation convenient. The adjustment screw can be preset to the buffer parameter in advance according to a customer's need. The central rod always seals the round hole on the partition wall under the pressure of the major spring, thus blocking the cold water channel and hot water channel. If there is a pressure, the partition wall can be put through by overcoming the pressure of the booster spring. This achieves the buffer effect. When the pressure of the water flow is smaller than that of the booster spring, water will not flow out directly, thus protecting the user. Even though the pressure of instant water flow is too high, it can be partially absorbed by the booster spring, thus reducing the water flow pressure and alleviating the impact to the valve. When the valve is closed, an instant close will make the water pressure too high. The instant pressure surge easily causes water backflow. The pressure surge can be absorbed by the buffer unit which can reduce the water flow, prevent the pressure from getting too high, avoid backflow, and avoid water pollution.

As a preferred embodiment, the embedded body is a structure of a cross shape. The front side is a flat plane. The hot water channel and the cold water channel are on the same straight line. Two water outlets are on the same straight line. There is a big hole on the plane. The hole center deviates from the line of the hot water channel and the cold water channel. The buffer unit is arranged in the big hole. The flat plane cooperates with the cover board. The contact plane is smooth, which lowers the probability of leakage, and facilitates processing and positioning of the embedded body. The big hole on the plane is used to place the buffer unit. The plane of the embedded body facilitates positioning and processing of the big hole. The position of the big hole deviates from the connecting line of the cold water channel and the hot water channel, lessening the volume of the valve as much as possible.

Preferably, the hot water channel and the cold water channel are provided with sinks where the partition wall is located. The sinks are directly opposite to the big hole. The bottom of the sink is the same as the inlet of the cold water channel and the hot water channel. The sink is provided with a round hole connected with the outlets of the cold water channel and the hot water channel on the lateral side. The center of the round hole on the partition wall and the center of the big hole are on the same line. A sink is arranged to place the buffer unit and also to facilitate placing the partition wall. The partition wall separates the sink into two chambers, one chamber communicating with the water inlet and the other chamber communicating with the water outlet. The partition wall is arranged inside the sink, so it is not necessary to be concerned with the sealing problem of the buffer unit.

Preferably, the buffer unit also contains a coupling nut, the adjustment screw being connected with the thread of the coupling nut, the adjustment screw being provided with a compressed channel inside thereof, a booster spring being arranged inside the compressed channel, the adjustment screw and the coupling nut being connected by a rubber seal ring. The adjustment screw has already been adjusted before the valve is installed. The coupling nut is used to fix the adjustment screw so as to prevent the thread gap between the adjustment screw and the coupling unit from leaking water. The rubber ring at the thread also facilitates the installation of the booster spring and the central rod. After being installed, the rubber ring is connected with the coupling nut to form a complete buffer unit.

Preferably, the embedded body has screw threads along the edge of the inner side of the big hole. The coupling nut has external threads through which the coupling nut is connected to the big hole. The coupling nut is fixed on the big hole of the embedded body through the external threads, thus facilitating determination of expansion of the central rod.

Preferably, the central rod is in the shape of "T". The vertical part of the central rod supports the booster spring and compresses the spring into the compressed channel. A sealing component with a wedge barb is arranged at the center of the straight part of the central rod. The casing of the sealing component is provided with a rubber ring. The barb limits the rubber ring. The sealing component is inserted into the round hole on the partition wall. The rubber ring seals the round hole. The sealing component as well as the rubber ring blocks the round hole on the partition wall. The sealing component will be opened only when the elasticity of the booster spring drops, the round hole is blocked, and the water pressure has reached a specific value, thus opening the water channel. The barb can prevent the rubber ring from escaping from the sealing component.

Preferably, the shell is a circular shape. The lateral wall of the shell is provided with four coupling holes communicated with water channels of the embedded body. The end of the water channel is provided with a lock nut. The embedded body is fixed on the coupling hole by the lock nut. The quantity of the connecting holes on the shell is equal to that of the water channels.

Preferably, the shape of the cover board fits in with the shape of the plane of the embedded body. The cover board has semi-round holes that avoid the buffer unit on lateral sides. The coupling thread holes are arranged around the cover board and the holes are fixed with the embedded body through bolts. When using the embedded body, the valve board needs to be connected; the valve core controls the openness of the water channel. The valve board has not been assembled when the valve is concealed into the wall, at this time, the cover board can cover the through holes to keep impurities outside.

Preferably, the embedded body is provided with through holes which communicate with the water channels in the embedded body respectively. The cover board is provided with two holes for holding water stops. The holes for holding water stops are provided with water stops inside thereof and reinforcing bars in surrounding area. Appropriate control valve shall be selected according to customers' requirement. The inner surface of the valve board on the control valve is provided with the control holes that communicate with the through hole. After water has entered the control valve through the water channel, it is controlled by the control valve to flow out from the appropriate water channel. In order to realize secondary pressure relief, the water channel on the embedded body adopts processing techniques of an inclined hole.

The present invention has the following advantages. The partition wall and the buffer unit are arranged away from the straight line in which the water channel is located, thus balancing the cold water pressure and hot water pressure, preventing too high instant pressure which significantly impacts the valve, thus extending the service life.

In the figure: 1. connecting hole, 2. shell, 3. lock nut, 4. embedded body, 5. rubber ring, 6. central rod, 7. booster spring, 8. rubber seal ring, 9. coupling nut, 10. adjustment screw, 11. semi-round hole, 12. cover board, 13. water stop, 14. water stop hole, 15. partition wall, 16. sealing component, 17. sink, 18. plane, 19. cold water channel, 20. through hole, 21. positioning hole, 22. hot water channel.

DETAILED DESCRIPTION OF THE EMBODIMENTS

The technical solution of the present invention is further specified through the following implementation example and attached drawings.

Figure 1:
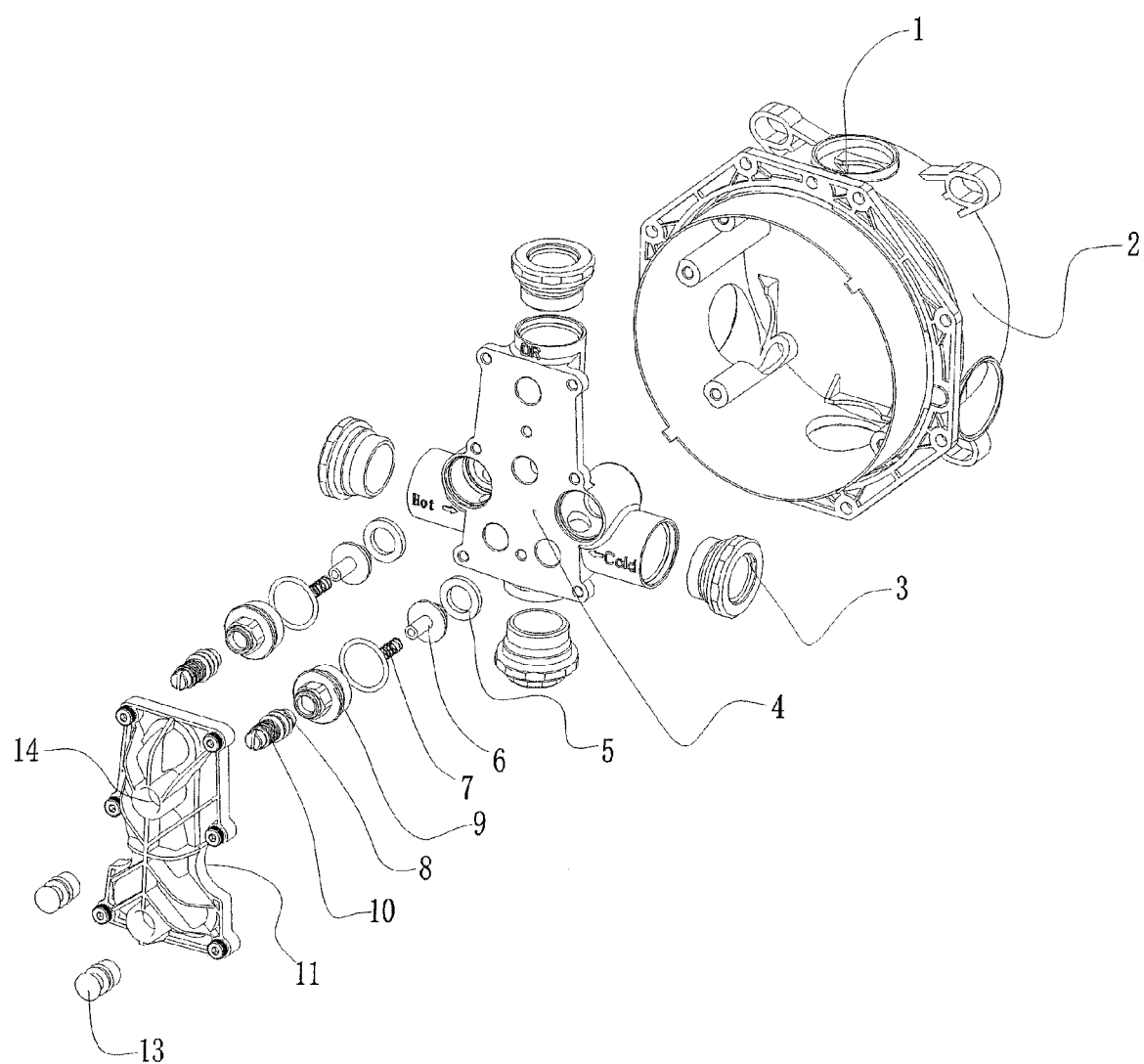
FIG. 1 is a schematic diagram of the present invention.
Figure 3:
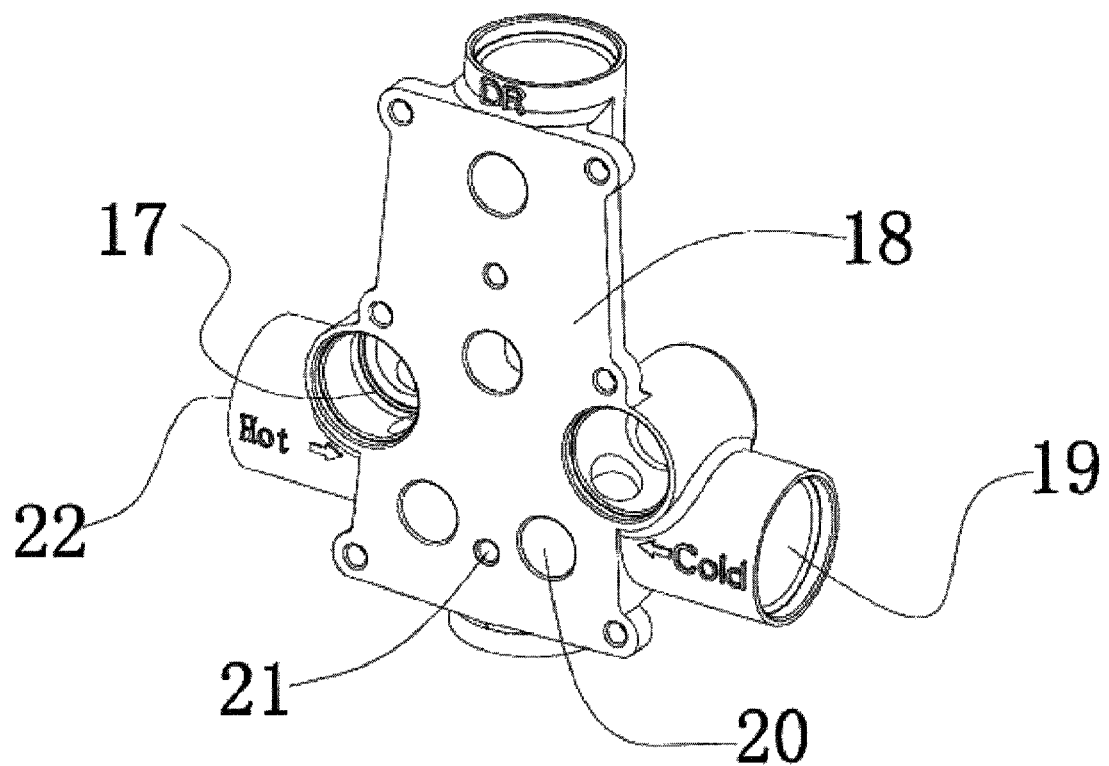
FIG. 3 is the schematic diagram of an embedded body of the present invention.

Implementation Example: The present invention discloses a concealed shower valve (see FIG. 1), including the circular shell 2 which is provided with four connection holes 1 around the periphery of the circular shell 2. Shell 2 is provided with an embedded body 4 with four water channels inside the embedded body 4. Four water channels include two water inlet channels and two water outlet channels. Water inlet channels can be divided into a cold water channel 19 and a hot water channel 22 (see FIG. 3). The position of the water channel of the embedded body 4 corresponds to the position of the through hole on the shell. The lock nut 3 is arranged at a port of the water channel of the embedded body 4 which is fixed on the shell 2 through the lock nut. The four water channels of the embedded body 4 form a cross shape. The front side of the embedded body 4 is the plane 18. The hot water channel 22 and the cold water channel 19 are on the same line. Two water outlets are arranged on the same line. The plane 18 is provided with two big holes, the center of which deviates from the straight line of the hot water channel and the cold water channel. The screw thread is arranged along the edge of the inner side of the big hole. The embedded body 4 is provided with a cylindrical sink 17 that is on the same axis with the big hole. A buffer unit is arranged inside the sink 17. The hot water channel and the cold water channel are provided with a partition wall 15 with round holes. The bottom of the sink 17 is the same as the inlet of the cold water channel and the hot water channel. The sink 17 is provided with a round hole that communicates with the cold water channel and the hot water channel on the lateral side. The center of the round hole on partition wall 15 is on the same line with the center of the big hole. The plane 18 is provided with four through holes 20 which communicate with the water channels on the embedded body 4 respectively. The plane 18 is provided with 2 positioning holes 21. The shape of the cover board 12 matches with that of plane 18 on embedded body 4. The cover board 12 is provided with semi-round holes 11 away from the buffer unit on both sides. The cover board 12 is provided with screw holes around and fixed with the embedded body 4 through the screw. The cover board 12 is provided with two water stop holes 14 which have water stops 13 inside and reinforcing bars around. The cover board 12 is positioned based on the positioning hole.

Figure 2:
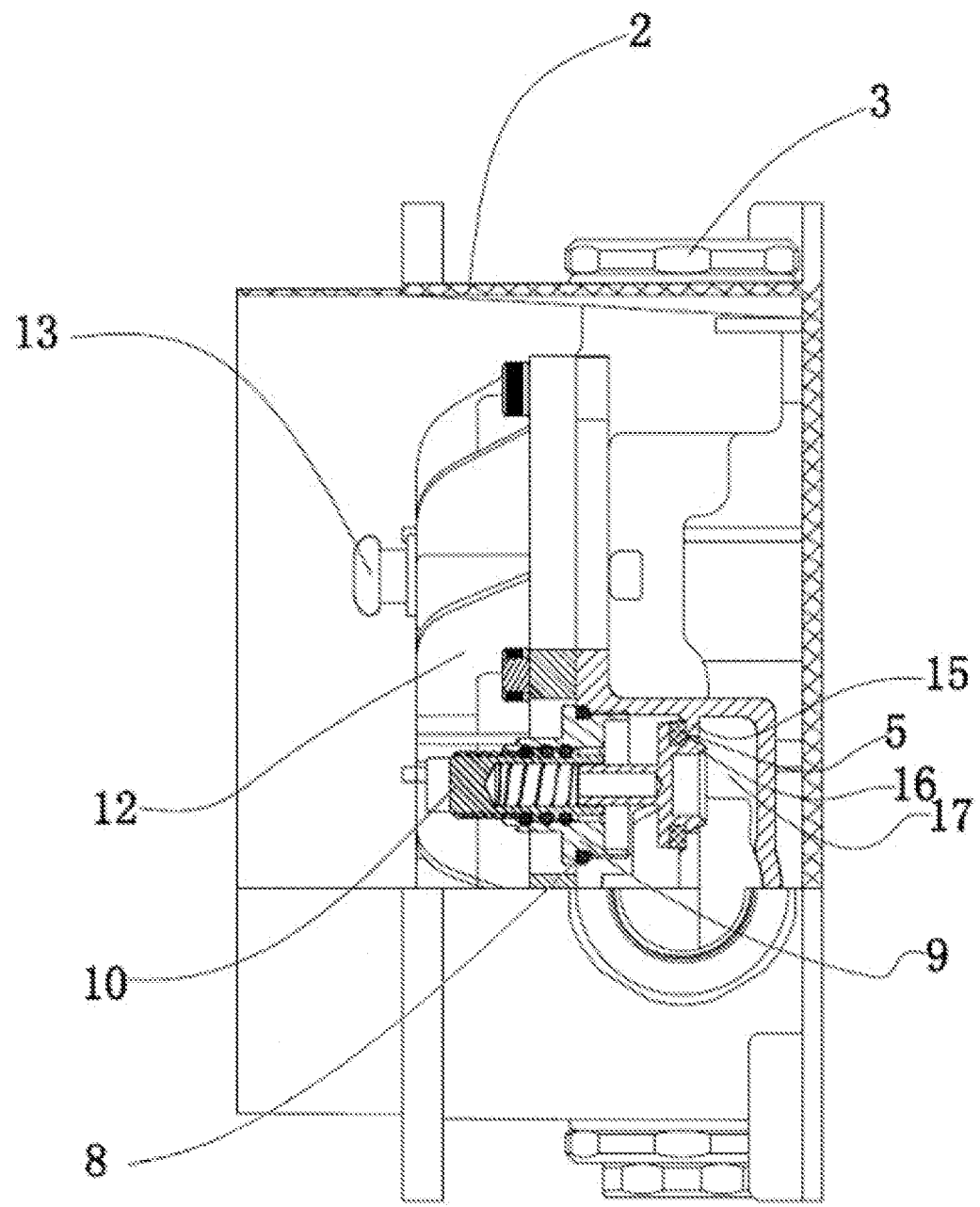
FIG. 2 is a sectional view of the present invention.

The buffer unit includes the coupling nut 9, the adjustment screw 10, the rubber seal ring 8, the booster spring 7, the central rod 6 and the rubber ring 5 (see FIG. 2). The adjustment screw 10 is connected with the coupling nut 9 through the thread. The thread is sleeved with a rubber seal ring 8. The coupling nut 9 is provided with an outer thread and fixes the whole buffer unit on the big hole through the outer thread. The adjustment screw 10 provided with a compressed channel in the middle in which the booster spring 7 is arranged. The central rod 6 is in the shape of "T". The vertical part of the central rod 6 supports the booster spring 7 and compresses the spring 7 into the compressed channel. A sealing component 16 with a wedge barb is arranged at the center of the straight part of the central rod 6. The casing of the sealing component 16 is provided with a rubber ring 5. The barb limits the rubber ring 5. The sealing component 16 is inserted into the round hole on the partition wall 15. The rubber ring 5 seals the round hole.

A control valve (not shown in the drawings) shall be installed when using the shower valve. There is no valve body during packing. The cover board (12) is used to cover the through hole (20) of the plane (18) of the embedded body of the shower valve to keep impurities from entering inside. There are control channels arranged according to customers' requirement inside the control valve. After the shower valve has been concealed into the wall, the control valve is fixed on the plane of the valve body. The control hole on the control valve communicates with the through hole on the plane. The water outlet solution can be selected by the control valve. Cold water or hot water enters the bottom of the sink through the corresponding channel. The pressure of the water flow ejects the sealing component. The central rod compresses the booster spring to put the round hole in the middle of the partition wall through, thus communicating the water inlet channel and the outlet channel. The water pressure drops. The central rod drops automatically under the return force of the booster spring. The sealing component blocks the round hole in the middle of the partition wall again and closes the passage between the inlet channel and the outlet channel.

The above example is only a preferred solution of the present invention, rather than limitation to the present invention in any form. It also has other variations and transformations within the technical solution recorded in the claims for patent application.

The invention claimed is:

1. A multi-functional concealed shower valve, including a shell, the shell being provided with an embedded body with water channels comprising channels for hot water and cold water, a cover board that communicates with the water channels being arranged on the surface of the body, wherein the hot water channel and the cold water channel are provided with a partition wall with a hole, the partition wall separates the water inlets and outlets of the hot water channel and the cold water channel, a buffer unit that can be opened and closed is arranged on the embedded body, the buffer unit contains a fixed adjustment screw and a corresponding booster spring and a central rod, an end of the central rod matches with the hole on the partition wall and can form an open or close structure; and wherein the embedded body is a structure of a cross shape, a front side of the embedded body is a flat plane, the hot water channel and the cold water channel are on the same axis, the two water outlets are on the same axis, there is at least one big hole on the plane, the big hole's center deviates from the axis of the hot water channel and the cold water channel, the buffer unit is arranged in the big hole.

2. The multi-functional concealed shower valve of claim 1 wherein the hot water channel or the cold water channel is provided with a sink where the partition wall is arranged and the sink is directly opposite to the big hole, the bottom of the sink is the same as the inlet of the cold water channel or the hot water channel, the sink is provided with a round hole connected with the outlets of the cold water channel or the hot water channel on the lateral side, the center of the hole on the partition wall and the center of the big hole are on the same axis.

3. The multi-functional concealed shower valve of claim 1 wherein the buffer unit also contains a coupling nut, the adjustment screw is connected with the coupling nut, the adjustment screw is provided with a compressed channel inside, the booster spring is arranged inside the compressed channel, the adjustment screw and the coupling nut are connected by a rubber seal ring.

4. The multi-functional concealed shower valve of claim 3 wherein the embedded body has a screw thread along the edge of the inner side of the big hole, the coupling nut has an external thread through which the coupling nut is connected to the big hole.

5. The multi-functional concealed shower valve of claim 3 wherein the central rod is in the shape of a "T", the central rod supports the booster spring and compresses the spring into the compressed channel, a sealing component with a wedge barb is arranged at the center of said end of the central rod, the periphery of the sealing component is provided with a rubber ring, the barb limits the rubber ring, the sealing component is inserted into the hole on the partition wall, the rubber ring seals the round hole.

6. The multi-functional concealed shower valve stated of claim 1 wherein the shell is in a circular shape, the lateral wall of the shell is provided with four coupling holes communicated with water channels of the embedded body, the end of one of the water channels is provided with a lock nut, the embedded body is fixed on one of the coupling holes by the lock nut.

7. The multi-functional concealed shower valve of claim 1 wherein the shape of said cover board fits in with the shape of the plane of the embedded body, the cover board has semi-round holes that avoid the buffer unit on lateral sides, coupling thread holes are arranged around the cover board and the coupling thread holes are fixed with the embedded body through bolts.

8. The multi-functional concealed shower valve of claim 1 wherein the embedded body is provided with through holes which communicate with the water channels in the embedded body, the cover board is provided with two holes for holding water stops, the holes for holding water stops are provided with water stops inside and reinforcing bars in a surrounding area.

9. The multi-functional concealed shower valve of claim 1, wherein there are two big holes on the plane, and wherein the hot water channel and the cold water channel are provided with sinks where the partition wall is arranged and the sinks are directly opposite to the big holes respectively, the bottom of the sinks is the same as the inlets of the cold water channel and the hot water channel, the sinks are each provided with a round hole connected with the outlets of the cold water channel and the hot water channel on the lateral side, the center of the hole on the partition wall and the center of the big holes are on the same axis.

* * * * *